United States Patent [19]

Watanabe

[11] 4,004,815

[45] Jan. 25, 1977

[54] MINIATURE TOY SOUND-REPRODUCING DEVICE

[75] Inventor: Katsumi Watanabe, Kawasaki, Japan

[73] Assignee: Yugen Kaisha Watanabe Kenkyusho, Japan

[22] Filed: June 26, 1975

[21] Appl. No.: 590,684

[30] Foreign Application Priority Data

Mar. 6, 1975 Japan .................... 50-29645[U]

[52] U.S. Cl. ............................................. 274/1 A
[51] Int. Cl.² ........................................ A63H 3/33
[58] Field of Search .................................. 274/1 A

[56] References Cited

UNITED STATES PATENTS

| | | | |
|---|---|---|---|
| 1,979,067 | 10/1934 | Franklin | 274/1 A |
| 3,468,546 | 9/1969 | Duncan et al. | 274/1 A |
| 3,532,346 | 10/1970 | Barcus et al. | 274/1 A |
| 3,667,765 | 6/1972 | Watanabe | 274/1 A |
| 3,721,449 | 3/1973 | Sirinek | 274/1 A |

*Primary Examiner*—Steven L. Stephan
*Attorney, Agent, or Firm*—Irving M. Weiner; Pamela S. Austin

[57] ABSTRACT

A simplified sound-reproducing device including a constant-torque spiral spring for driving a turntable on which a phonograph record is irreplaceably mounted. The spiral spring is unwound as a manual pull is exerted on a string extending out of the device, and upon release of the string, is rewound to its initial configuration, thereby causing the turntable to rotate in a predetermined direction. A reproducing stylus on a pivotal pickup arm rides in the groove on the record, and the vibrations set up in the stylus and pickup arm during record rotation are directly transmitted to a diaphragm to cause the same to emanate audible sound. Measures are taken against diaphragm deformation due to heat or shock which may be caused through the pickup arm.

8 Claims, 7 Drawing Figures

MINIATURE TOY SOUND-REPRODUCING DEVICE

BACKGROUND OF THE INVENTION

My invention relates to a simplified sound-reproducing device, and more specifically to a device for reproducing sound from a record or grooved disc irreplaceably mounted on a turntable by use of mechanical means only. The sound-reproducing device according to my invention can be so miniaturized as to be easily built, for example, into a doll as its vocal source.

There are numerous difficulties in designing a sound-reproducing device of the class and kind under consideration, because the device must be as compact, simple and inexpensive as possible in construction but should nevertheless be durable and reliable in operation. One of the difficulties resides in the arrangement of a diaphragm which is disposed in direct contact with a pickup arm carrying a reproducing stylus on its free end and which is caused to produce sound by vibrations transmitted from the stylus through the pickup arm. The diaphragm must therefore be protected against deformation that may be caused by heat or shock conducted through the pickup arm.

SUMMARY OF THE INVENTION

It is a principal object of my invention to provide a simplified, small-sized sound-reproducing device which is constituted of mechanical means only and which is extremely inexpensive in construction but positive and reliable in operation.

Another object of the invention is to provide a sound-reproducing device wherein a diaphragm is protected against deformation due to heat or shock which may be caused through a pickup arm in direct contact therewith, without any substantial impairment of the quality or volume of the sound produced.

A further object of the invention is to provide a sound-reproducing device including a turntable with a phonograph record thereon which is driven only in a predetermined direction by constant-torque spring means for playback operation.

A further object of the invention is to provide a sound-reproducing device including governor means for automatic control or limitation of the speed of rotation of the turntable.

A still further object of the invention is to provide a sound-reproducing device wherein the governor means can be used in combination with means for fine manual adjustment of the rotation speed of the turntable.

With all these and other objects in view my invention is directed, in brief, to the provision of a sound-reproducing device including a rotor mounted on an upright shaft within a casing so as to be both rotatable and movable up and down relative to the shaft. The rotor is normally held in an elevated position on the shaft by biasing spring means, and constant torque spring means is provided which is capable of exerting constant torque on the rotor to cause the same to rotate in a predetermined direction. A turntable with a phonograph record thereon is arranged coaxially with the rotor for simultaneous up-and-down motion therewith. The turntable is rotatable with the rotor only in the predetermined direction, however, because of clutch means provided therebetween. A pickup arm is pivotally supported over the turntable so that a reproducing stylus on its free end may ride in the groove on the record while the rotor is in its elevated position. Further, over the pickup arm there is arranged a diaphragm having a contact portion in direct contact with the pickup arm.

In the preferred form of the sound-reproducing device disclosed herein, a string is wound around a reel which is rotatable and movable up and down simultaneously with the rotor. Upon exertion of a manual pull on this string the rotor is caused to rotate in a direction opposite to the predetermined direction against the force of the constant torque spring means and at the same time to descend from the elevated position against the force of the biasing spring means. The pickup arm automatically returns to its starting position over the record during descent of the rotor, and as the string is released succeedingly, the turntable rises to the elevated position with the rotor and starts rotation in the predetermined direction. The vibrations caused in the stylus in contact with the record groove are transmitted via the pickup arm to the diaphragm thereby causing the latter to produce audible sound corresponding to the vibrations.

The features which are believed to be novel and characteristic of this invention are set forth in particular in the appended claims. The invention itself, however, both as to its organization and mode of operation, together with the further objects and advantages thereof, will become apparent in the course of the following description read in connection with the accompanying drawings in which like reference characters refer to like parts throughout the several views.

DESCRIPTION OF THE PREFERRED EMBODIMENT

Figure 1:
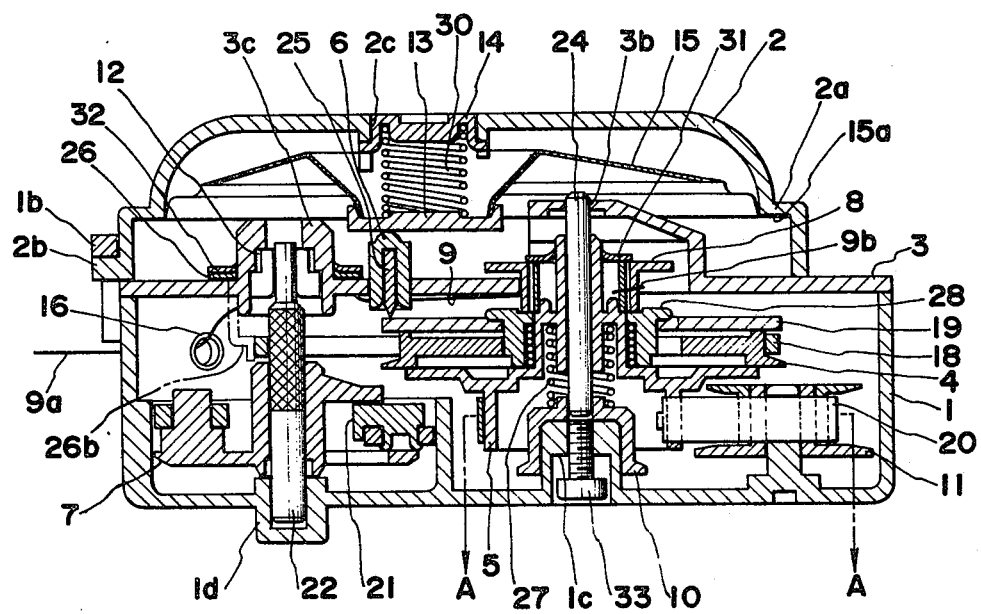
FIG. 1 is a vertical sectional view of a sound-reproducing device constructed in accordance with the novel concepts of my invention.
Figure 2:
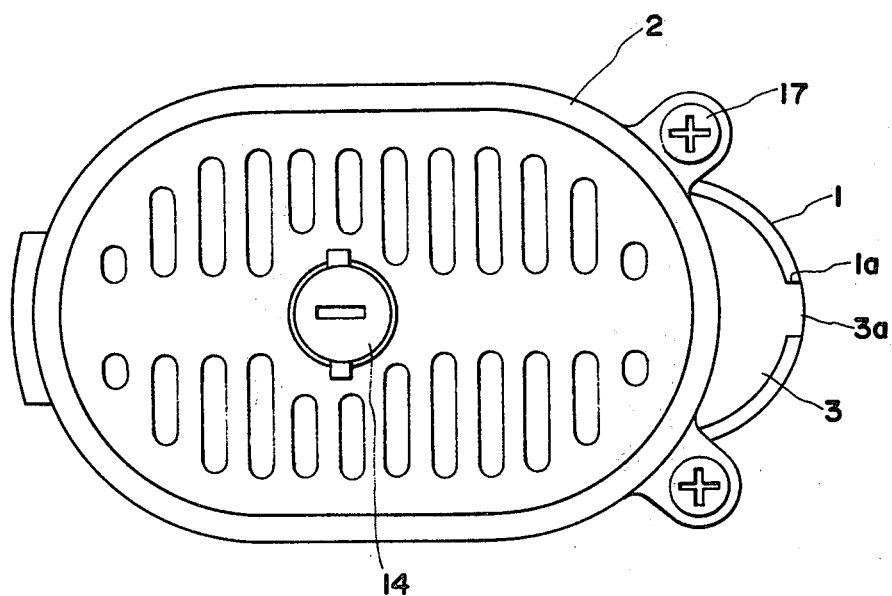
FIG. 2 is a top plan view of the device shown in FIG. 1.
Figure 6:
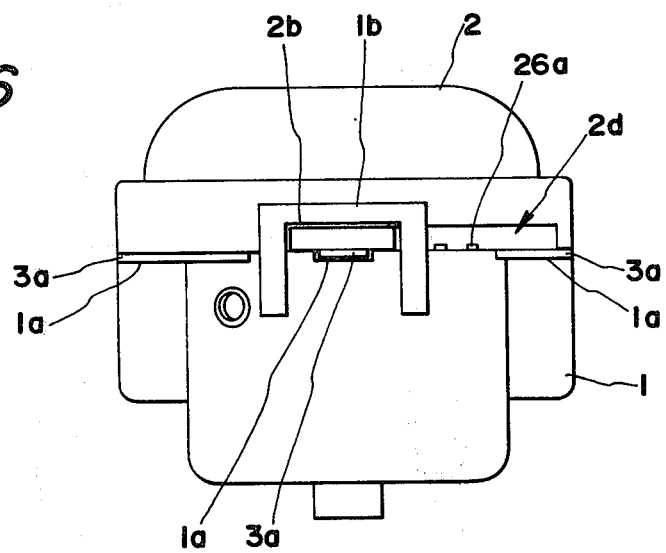
FIG. 6 is a left-hand side elevational view of the device as shown in FIG. 1.

With reference to FIGS. 1, 2 and 6 in particular, the sound-reproducing device shown therein by way of a preferred embodiment of my invention includes a casing 1 that may be conveniently molded of plastics. The casing 1 includes a top panel 3, as shown also in FIG. 3, and there is mounted over this top panel a cover 2 which doubles as a jacket for a loudspeaker including a diaphragm 15. The top panel 3 has several projections 3a along its periphery which are closely fitted in corresponding recesses 1a on the top edge of the casing 1.

As best shown in FIG. 2, the cover 2 should be suitably slotted or otherwise apertured to enhance its function as the loudspeaker jacket. The cover 2 has a tongue 2b on one end engaged by an inverted-U-shaped hook 1b, FIG. 6, that is integral with the casing 1. A pair of lugs are formed adjacent the opposite end of the cover 2, in register with respective similar lugs on the casing 1, and these lugs are fastened together by screws 17.

Figure 3:
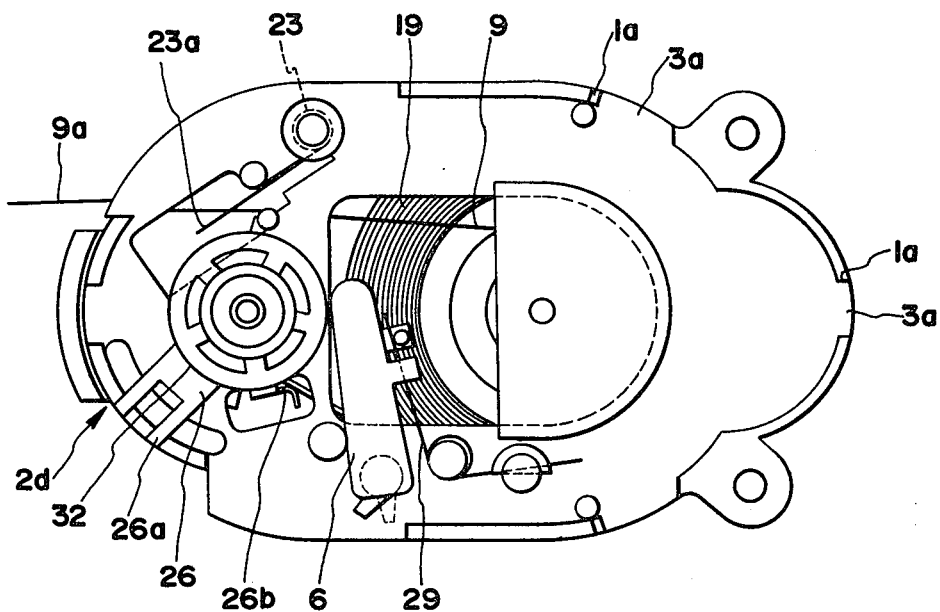
FIG. 3 is also a top plan view showing the device with its cover removed.
Figure 4:
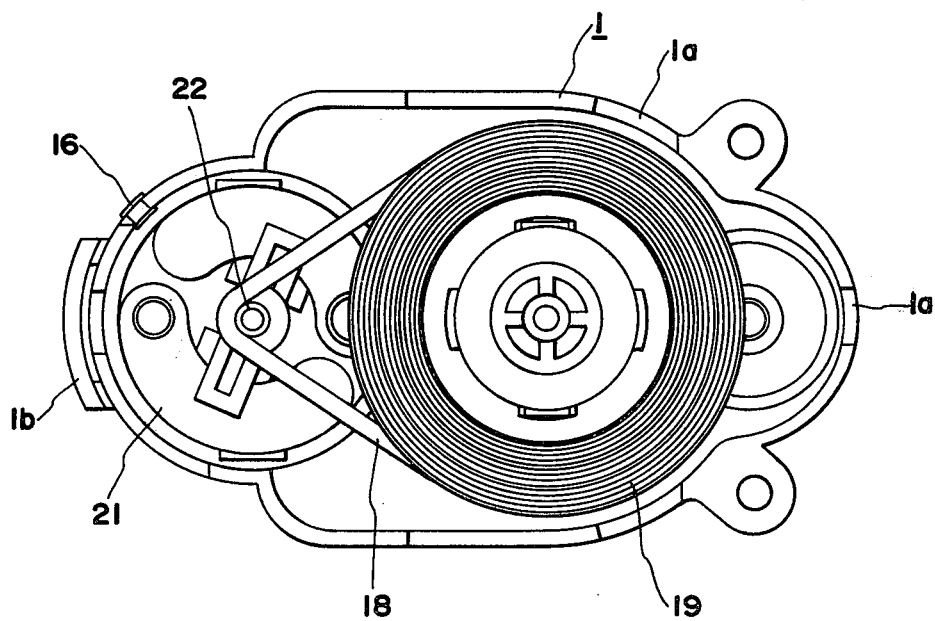
FIG. 4 is also a top plan view showing the device with its top panel also removed.

Within the casing 1 an upright shaft 24 has its top end received in a hole 3b of the top panel 3 and is securely mounted at its bottom end on a spring retainer 10 fitted over a boss 1c on the bottom of the casing. A turntable 4 is mounted on the shaft 24 so as to be moved up and down and rotated in a predetermined direction only, which is clockwise as seen in FIG. 3 or 4, by means hereinafter set forth. The turntable has irreplaceably mounted thereon a phonograph record 19 which is specifically designed for use with this type of sound-reproducing device.

Figure 7:
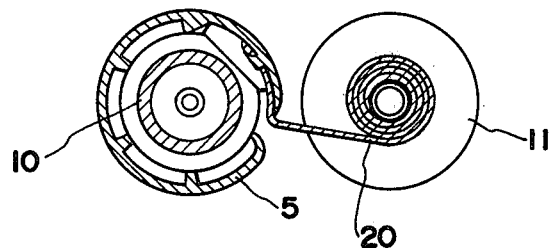
FIG. 7 is a sectional view taken along the plane of line A—A in FIG. 1.

Slidably mounted on the shaft 24 is a rotor 5 the bottom end portion of which is shaped into a reel to which there is affixed one end of a constant-torque spiral spring 20. As will be seen also from FIG. 7, the spiral spring 20 is normally loosely wound around a stationary spool 11 mounted on the bottom of the casing 1 and is to be wound around the reel portion of the rotor 5 as the latter is forced to rotate counterclockwise as viewed in the drawing. Succeedingly, as the rotor 5 is set free from the force that has been causing its counterclockwise rotation, the spiral spring 20 will be rewound to its initial configuration around the spool 11 by virtue of its own stored energy, thereby causing the rotor to rotate clockwise simultaneously.

The turntable 4 together with the record 19 is coaxially mounted on the rotor 5 via spring clutch 28 adapted to connect the turntable to the rotor only during the clockwise rotation of the latter. The spring clutch 28 consists essentially of a helically wound spring so arranged that only during the clockwise rotation of the rotor 5, the spring will increase in diameter into frictional contact with the turntable 4. During the counterclockwise rotation of the rotor, the spring does not increase in diameter and is held out of contact with the turntable.

A helical compression spring 27 is arranged between the spring retainer 10 and rotor 5 to bias the latter upwardly to its elevated position as shown in FIG. 1. In this elevated position of the rotor 5 the record 19 on the turntable 4 is urged into contact with a reproducing stylus 25 projecting downwardly from one end of a pickup arm 6. As illustrated in FIG. 3, this pickup arm is pivotally supported at another end on the top panel 3 of the casing 1. A torsion spring is arranged at 29 to yieldably urge the pickup arm to its starting position over the record 19.

A reel 8 is arranged coaxially over the rotor 5 and is engaged by a retainer 31 for simultaneous rotation and up-and-down motion with the rotor. A string 9 has one of its ends affixed to the reel 8 at 9b and another end 9a led out of the casing 1 through a reinforced eyelet 16 formed therein. Normally, the string 9 is wound a suitable number of turns around the reel 8, in such a way that when the string is manually pulled away from the casing, the reel will rotate counterclockwise with the rotor 5 against the force of the constant-torque spiral spring 20.

Moreover, the eyelet 16 is so positioned relative to the reel 8 that the manual pull on the string 9 will cause the reel, and therefore the rotor 5, to descend along the shaft 24 against the bias of the compression spring 27. Since the turntable 4 as well as the record 19 thereon is arranged for simultaneous up-and-down motion with the rotor 5, the record moves out of contact with the stylus 25 during exertion of the pull on the string 9.

It will be noted from FIG. 3 that the string 9 extends over one end 23a of a spring 23 which is supported at another end on the top panel 3 of the casing 1. This spring is intended to hold the string 9 out of contact with the record 19 while the latter is in its elevated position for playback operation.

The spring retainer 10 for the compression spring 27 is fitted over the boss 1c so as to be capable of moving up and down relative to the same. An adjusting screw 33 of slotted-headed type is inserted upwardly into a tapped hole in the boss 1c. Thus, by the turn of the screw 33, the spring retainer 10 is adjustably movable up or down to regulate the pressure of the compression spring 27 against the descent of the rotor 5 and so forth.

Over the pickup arm 6 there is arranged a diaphragm 15 which in one form of construction is molded of plastics. The diaphragm 15 is substantially frustoconical in shape and includes a funneled internal portion extending downwardly from its top. The marginal edge 15a at the bottom of the diaphragm is secured to an inside step 2a on the cover 2. The diaphragm has a contact portion 13 fixedly provided at the bottom end of its funneled portion for direct contact with the pickup arm 6 at its stylus-carrying end. The contact portion 13 has a sufficient surface area to remain in contact with the pickup arm 6 in spite of its angular movement during playback operation.

Arranged between the contact portion 13 of the diaphragm 15 and the cover 12 is a helical compression spring 30 designed to prevent deformation of the diaphragm due to heat and shock that may be transmitted through the pickup arm 6. The force of this compression spring should be such that it will not substantially impair the volume and quality of the sound produced by the diaphragm. The cover 2 has an opening 2c in register with the diaphragm contact portion 13, and a spring retainer 14 is fitted in this opening after insertion of the compression spring 30 therethrough. It is possible in this manner to install the spring after the diaphragm has been attached to the cover 2.

Figure 5:
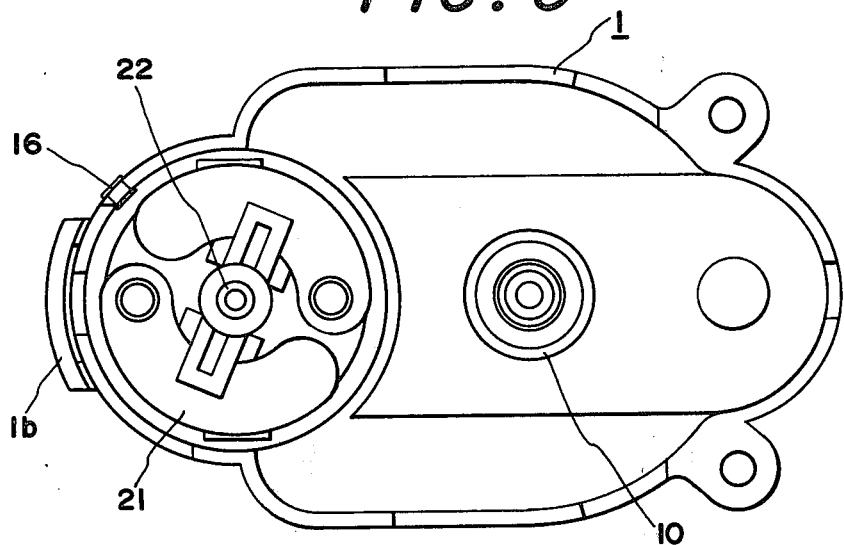
FIG. 5 is also a top plan view showing only the governor means and casing of the device.

In FIGS. 1, 4 and 5 there is shown at 22 an upright governor shaft which is rotatably journaled at its bottom end in a boss 1d on the bottom of the casing and at its top end in a bearing 12 supported in a boss 3c on the top panel. An endless belt 18 extends around the knurled mid-portion of this governor shaft and the flanged circumference of the turntable 4, so that the governor shaft rotates simultaneously with, and in the same direction as, the turntable. A disc 7 is fixedly mounted on the governor shaft for simultaneous rotation therewith, and a pair of flyweights 21 are pivotally supported each at one end on the disc 7. Thus, during rotation of the turntable 4 for playback operation, the flyweights 21 will be centrifugally swung outwardly into sliding contact with the surrounding wall of the casing 1, thereby affording automatic control or limitation of the speed of turntable or record rotation.

The sound-reproducing device according to my invention can be further equipped with means for fine manual adjustment of the speed of record rotation. To this end a speed regulator member 26 is relatively tightly fitted over the boss 3c on the top panel and is restrained from detachment by a retainer ring 32, as best shown in FIGS. 1 and 3. The speed regulator member 26 includes a lever 26a having a bifurcated end which projects outwardly through a recess 2d formed in the cover 2, as will be seen by referring also to FIG. 6.

The speed regulator member also includes a brake arm 26b extending downwardly through an opening in the top panel 3 for frictional contact with the endless belt 18 extending between the turntable 4 and governor shaft 22. It should be noted that the speed regulator member 26 is fitted over the boss 3c in such a manner that the former is angularly displaceable about the latter only upon exertion of manual effort on the lever 26a. This lever may therefore be turned in either direction to vary the degree of friction imposed on the belt 18 by the brake arm 26b during rotation of the turntable 4 for playback operation.

In the use of the sound-reproducing device of the above described construction, the string 9 may be pulled away from the casing 1 to cause the reel 8 and rotor 5 to rotate counterclockwise and to descend along the shaft 24 against the force of the compression spring 27. During this counterclockwise rotation of the rotor 5 the constant-torque spiral spring 20 is unwound from the spool 11 and is wound around the reel portion of the rotor. The clutch spring 28 holds the turntable 4 disengaged from the rotor 5 during the counterclockwise rotation of the latter.

Since the turntable 4 with the record 19 thereon also descends with the rotor 5 upon exertion of a pull on the string 9, the record moves out of contact with the stylus 25. The pickup arm 6 is thereupon returned to the starting position of FIGS. 1 and 3 by the torsion spring 29 and is retained in that position as the arm abuts against the edge of the opening formed in the top panel 3.

As the string 9 is released succeedingly, the record 19 returns to the elevated position with the reel 8, turntable 18 and rotor 5 under the influence of the compression spring 27. The stylus 25 now rides in the groove on the record 19 at its starting point. Simultaneously, the rotor 5 starts rotation in the clockwise direction as the spring 20 is rewound around the spool 11 by virtue of the energy stored in itself. Since the clutch spring 28 increases in diameter during the clockwise rotation of the rotor 5, the turntable 4 is thereby frictionally caused to rotate with the rotor. With the record 19 thus set in rotation, the stylus 25 traces its groove, and the vibrations set up in the stylus are transmitted via the pickup arm 6 and contact portion 13 to the diaphragm 15, so that the diaphragm will produce audible sound corresponding to the vibrations.

Preferably, several discrete grooves should be formed, each in a multiturn spiral, on the record 19 so that the stylus 25 may return to the starting point of a different groove each time the string 9 is pulled. In this manner the device will successively reproduce different pieces of audio information contained in the several grooves.

While the various objects of my invention, either expressly stated or otherwise, are believed to have been fully realized in the preferred form of the sound-reproducing device herein disclosed, it is also understood that the invention itself is not to be restricted by the exact showing of the drawings or the description thereof, as many modifications will readily occur to the specialists on the basis of this disclosure. It is therefore appropriate that the invention be construed broadly and in a manner consistent with the spirit and scope of the following claims.

I claim:

1. A simplified device for sound reproduction comprising, in combination:

a. a casing;
   b. a shaft mounted uprightly within said casing;
   c. a rotor slidably mounted on said shaft, said rotor being both rotatable and movable up and down relative to said shaft;
   d. biasing spring means for yieldably urging said rotor upwardly to normally hold the same in an elevated position on said shaft;
   e. constant torque spring means for exerting constant torque on said rotor to cause the same to rotate in a predetermined direction;
   f. means actuated manually for rotating said rotor in a direction opposite to said predetermined direction against the force of said constant torque spring means while simultaneously causing said rotor to descend from said elevated position against the force of said biasing spring means, including
      1. A reel arranged coaxially with said rotor so as to be movable up and down and rotatable simultaneously therewith; and
      2. a string having one end affixed to said reel and another end led out of said casing through an eyelet positioned in the side wall of said casing, said string being adapted to be pulled manually to cause said rotor to rotate in said opposite direction and to descend from said elevated position against the force of the said biasing spring means; and
      3. a spring over-hung above said record on which said string is held out of contact with said record;
   g. a turntable arranged coaxially with said rotor and movable up and down simultaneously therewith, said turntable having a phonograph record thereon;
   h. clutch means for connecting said rotor to said turntable only during rotation of said rotor in said predetermined direction, whereby said turntable with said record is rotatable simultaneously with said rotor in said predetermined direction;
   i. a pickup arm pivotally supported at one end and having a reproducing stylus at the other end, said stylus being adapted to ride in a groove on said record on said turntable when said rotor is in said elevated position;
   j. means for causing said pickup arm to return to a predetermined starting position over said record during descent of said rotor from said elevated position; and
   k. a diaphragm including a contact portion which is arranged in direct contact with said pickup arm, whereby the vibrations set up in said stylus during rotation of said record in said predetermined direction are transmitted to said diaphragm to cause the same to produce audible sound.

2. The device as recited in claim 1, wherein said rotor includes a reel portion, and wherein said constant torque spring means comprises:

a. a spool arranged adjacent said reel portion of said rotor; and
   b. a spiral spring normally wound around said spool and having one end affixed to said reel portion of said rotor so as to be wound around the latter during rotation of said rotor in said opposite direction.

3. The device as recited in claim 1, wherein said clutch means includes a helical spring arranged between said rotor and said turntable, said helical spring being adapted to increase in diameter into frictional contact with said turntable only during rotation of said rotor in said predetermined direction.

4. The device as recited in claim 1, wherein said diaphragm is substantially frustoconical in shape including a funneled internal portion extending downwardly from its top and is secured to said casing at a marginal edge of its bottom, said contact portion being arranged at the bottom end of said funneled internal portion.

5. The device as recited in claim 4, including spring means arranged over said contact portion of said diaphragm to prevent deformation of said diaphragm due to heat and shock that may be transmitted thereto through said pickup arm.

6. The device as recited in claim 1, further including governor means adapted to afford automatic control of the speed of rotation of said record.

7. The device as recited in claim 6, wherein said governor means comprises:
 a. a second shaft rotatably supported uprightly within said casing;
 b. an endless belt extending around said second shaft and said turntable, whereby said second shaft rotate simultaneously with said turntable; and
 c. flyweight means mounted on said second shaft.

8. The device as recited in claim 7, further including speed regulator means for fine manual adjustment of the speed of rotation of said record, said speed regulator means comprising:
 a. a lever pivotally supported at one end and adapted to be actuated manually; and
 b. a brake arm formed integral with said lever and arranged for frictional contact with said endless belt of said governor means, whereby the degree of friction imposed on said belt by said brake arm is adjustably variable by said lever.

* * * * *